(No Model.) 2 Sheets—Sheet 1.
DE WITT HAWLEY.
TAILOR'S MEASURE.
No. 439,747. Patented Nov. 4, 1890.
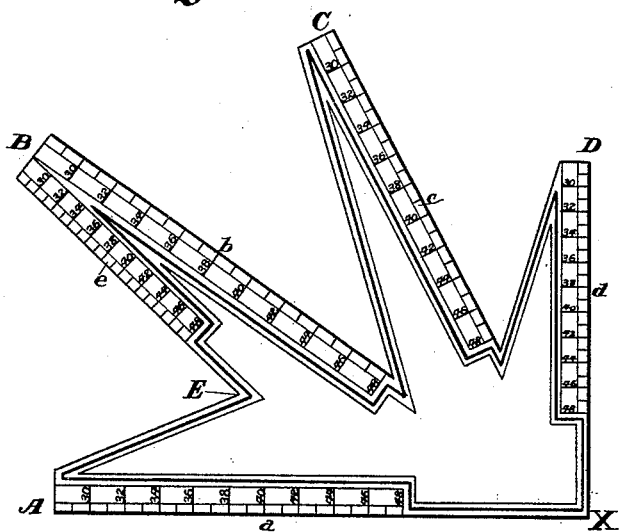

(No Model.) 2 Sheets—Sheet 2.
DE WITT HAWLEY.
TAILOR'S MEASURE.
No. 439,747. Patented Nov. 4, 1890.
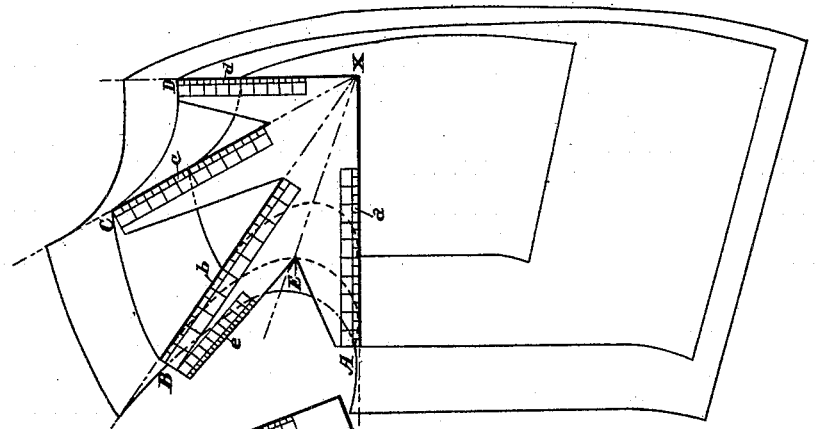
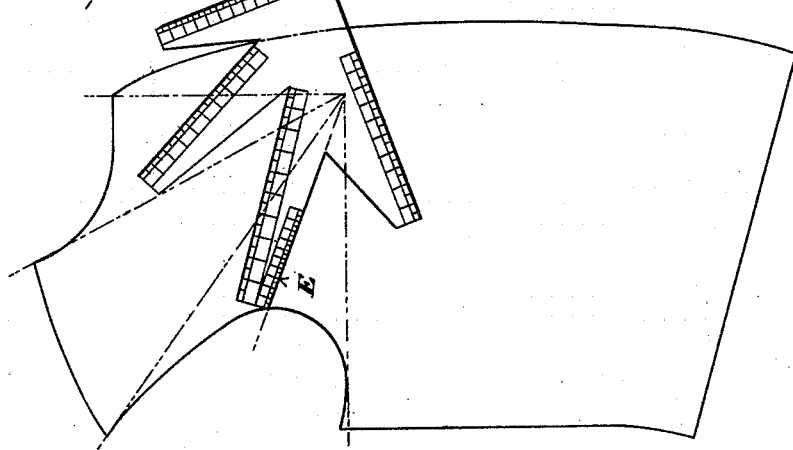
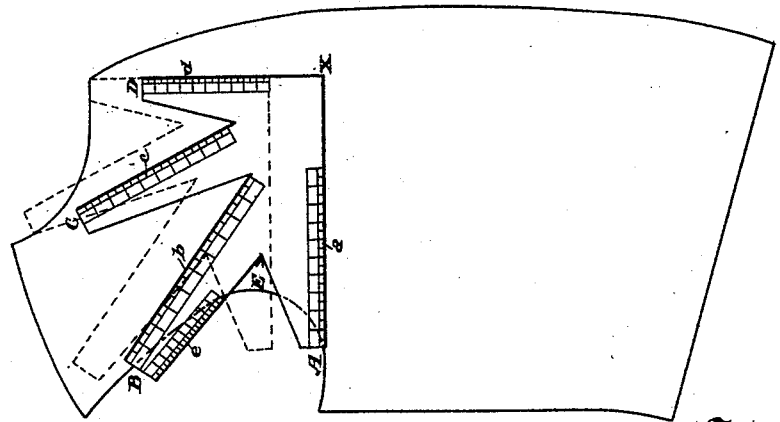

UNITED STATES PATENT OFFICE.

DE WITT HAWLEY, OF ROCHESTER, NEW YORK.

TAILOR'S MEASURE.

SPECIFICATION forming part of Letters Patent No. 439,747, dated November 4, 1890.

Application filed July 25, 1890. Serial No. 359,946. (No model.)

*To all whom it may concern:*

Be it known that I, DE WITT HAWLEY, a citizen of the United States, and a resident of the city of Rochester, in the county of Monroe and State of New York, have invented a new and useful Implement for Laying Out Garment-Patterns, of which the following is a specification, reference being had to the accompanying drawings, in which—

Figure 1 is a plan view of one side of my device. Fig. 2 is a plan view of the other side of my device. Fig. 3 is a plan view of my device in position upon a garment-pattern, the dotted lines showing the use of one scale thereof. Fig. 4 is a plan view of my device in position upon a garment-pattern, showing the use of another scale thereof. Fig. 5 is a plan view of my device in position upon a garment-pattern, showing the use thereof in laying out garments of different sizes at one time.

The object of my invention is to produce an implement by which garment-patterns of different sizes can be easily and accurately laid out. Such objects are attained by the device hereinafter described and claimed.

In the drawings I show and in this specification I describe my device as applied to laying out one side of a man's vest or one side of the fore part of a man's coat, and the device so shown and described is provided with scales based upon a normal chest-circumference of twenty-eight (28) inches. I select a twenty-eight-inch basis because it is a minimum adult chest-circumference.

My device is formed from a plate of sheet metal, card-board, or other suitable material, and has four arms A B C D, upon each of which is a scale. The outer sides of two of these arms are at right angles to each other, one side A (herein called the "base") being about eight inches long, and the other side D (herein called the "vertical") being about five and three-eighths (5⅜) inches long. On the outer line of the base side is a scale $a$ and on the outer line of the vertical side is a scale $d$. Between these two arms and at angles of thirty-five (35) degrees and sixty-two and one-half (62½) degrees with the base-line, respectively, are two other scales $b$ $c$ on the sides of the arms B C, which form the said angles, respectively. The arm at thirty-five degrees extends about ten and one-eight inches from the right angle and the arm at sixty-two and one-half degrees extends about eight and one-quarter inches from the right angle. The apex of the right angle is marked X in the figures.

At a point about five and one-half inches from the right angle and in a line forming an angle of twenty degrees with the base-line is a notch E between the two arms A B and on one of the arms adjacent to this notch is a fifth scale $e$.

The scales on the arms of the device shown are as follows: On the base-line about four inches to one, on the vertical line about five inches to one, on the thirty-five-degree line about three inches to one, on the sixty-two-and-one-half-degree line about three and three-quarters inches to one, and on the line adjacent to the notch about five and three-fifths inches to one. These scales run backward from the ends of the arms toward the apex X of the right angle, and the numbering upon them increases from twenty-eight at the ends of each arm in the same direction.

In order to lay out a pattern by this device for a vest or coat for an individual having a chest-circumference of twenty-eight inches, I place the same upon a piece of cloth or paper, mark a line along the base-line A X of the device, mark a line along the vertical D X, mark a line along the arm of sixty-two and one-half degrees angle C X, mark a line along the thirty-five degrees angle B X, mark the position of the notch E, and draw a radial line from the apex X of the right angle through the mark showing the position of the notch E. Marks are then made at the end of each arm intersecting the respective radial lines, leaving the implement in position on the lines so drawn. The mark on the end of the vertical line gives the point where the two parts of the collar join in front, the mark on the end of the base-line gives the point under the arm where the back and front of the vest meet, the mark on the end of the line at thirty-five degrees angle gives the outer point of the shoulder-seam, the mark on the end of the line at sixty-two and one-half degrees angle gives the inner point of the shoulder-seam, and the position of the notch E gives the point of extreme curvature of the armhole. These points are then joined by suitable free-hand curves, (see Fig. 5,) which any tailor will be able to make without instruction.

The purpose of making the scales to increase toward the apex of the right angle will be seen in the following description of laying out a vest or coat for an individual having a chest-circumference of thirty-four inches: Radial lines are drawn along the lines of the respective arms, and a radial line is drawn from the apex X of the right angle through the mark showing the position of the notch E. Each of these radial lines is then sufficiently produced. The points marked on the pattern, as hereinbefore described, at the ends of the arms, indicate the points for a twenty-eight-inch vest. To lay out a thirty-four-inch vest the scales on the respective arms are moved out along the corresponding radial lines (produced as above mentioned) until the figure 34 coincides with the twenty-eight-inch mark. A mark is then made on each of the lines so produced at the end of the corresponding arm in the latter position. (See Fig. 3.) To find the point of extreme curvature of the armhole, the corresponding scale e is placed on the twenty-degree line, with the mark 34 coinciding with the mark showing the position of the notch E. A mark is then made at the end of the arm, and this will give the desired point. (See Fig. 4.)

In order to make a garment smaller than twenty-eight inches, it is necessary only to substract from twenty-eight the number of inches corresponding with the chest-measurement of the individual, then to count back from the end of the arm the number of divisions necessary to reduce the measurment from twenty-eight—as, for instance, if the chest-measurement is twenty inches it will be necessary to count back and mark the point eight divisions from the end of each arm. (See Fig. 5.) The length of the vest or coat from the base-line A X to the waist or to the bottom of the skirt and the line showing where one half of the front meets the other half are determined by other measurements of the individual. By marking the scales in this way the size of the implement is kept small and its use is thereby rendered easy as compared with its size. If the scales run outward away from the apex of the right angle, the length of the arms for laying out a maximum-sized vest or coat would be very much greater than they are in the preferred form of my device, and would thus make the implement relatively more unwieldly.

When the implement is made in the way which I prefer—viz., as shown—it is smaller and more easily handled than a larger one would be, and marking the scales to run backward from the ends of the arms obviously renders it easier to find and mark the desired points on the radial lines.

As shown in the figures, I prefer to mark scales on both sides of my device, so that the operator may work from either side of the vertical lines.

In laying out a pattern for a coat or vest the most difficult points to determine, in order to produce an accurate fit, are the five points determined by my implement—namely, the point where the collar meets in front, the point under the arm where the back and front of the garment meet, the outer and inner points of the shoulder-seam, and the point of extreme curvature of the armhole.

I use a similar suitable implement for laying out the back of the coat or vest, having similar suitable scales marked upon suitable arms in order to give the same five points necessary to determine the pattern for the back.

It is obvious that the determination of the point of extreme curvature of the armhole is less necessary than the other four points, and means for determining this point may be omitted from my device at pleasure.

In actual practice I find that an inexperienced tailor may by means of my device in a very few lessons learn to cut garments which will make an accurate fit upon the customer.

What I claim is—

1. In an implement for laying out garment-patterns of the class described, a plate of suitable material having four arms, two forming a right angle with each other and the other two having each a side projecting radially from the right angle and provided with suitable scales marked upon each of said arms, as and for the purposes described.

2. In an implement for laying out garment-patterns of the class described, a plate of suitable material provided with arms having sides radial from a center and scales marked upon the respective arms, whereby the arms give the direction and the scales give the distance of desired points of the garment-pattern from the center, substantially as described.

3. In an implement for laying out garment-patterns of the class described, a plate of suitable material provided with arms having sides radial from a center and scales marked upon the respective arms, whereby the arms give the direction and the scales give the distance of desired points of the garment-pattern from said center, said scales extending and numbered from the ends of said arms toward said center, substantially as described.

4. In an implement for laying out garment-patterns of the class described, a plate of suitable material having two edges at right angles with each other and having indentations suitable to form four arms, said arms provided with scales and set at angles to indicate the middle collar-point of the garment, the inner and the outer points of the shoulder-seam thereof, the seam-point under the arm, and the point of extreme curvature of the armhole, substantially as described.

5. In an implement for laying out garment-patterns of the class described, a plate of suitable material having radial arms indicating the direction from the center of the middle collar-point, the inner and the outer points of the shoulder-seam and the seam-point under the arm, said arms being of the same lengths from said center as are the distances of said four points in a small normal garment, said arms having scales marked upon them, respectively, increasing toward said center from the ends thereof proportioned to give the increase of the distances of said points from said center in larger garments.

DE WITT HAWLEY.

Witnesses:
 HORACE MCGUIRE,
 EMILY M. DECKER.